G. C. HALL & A. BRADSHAW.
VALVE FOR PIPES FOR THE CONDUCTION OF LIQUID AND GASEOUS FLUIDS.
APPLICATION FILED AUG. 30, 1915.

1,222,758.

Patented Apr. 17, 1917.

Witnesses.

Inventors.
George C. Hall
Alfred Bradshaw

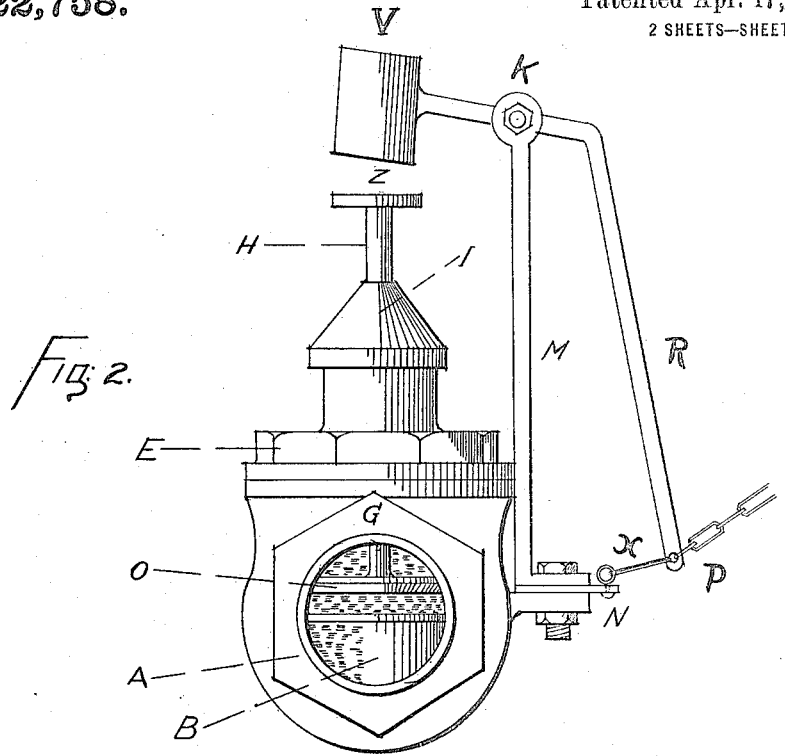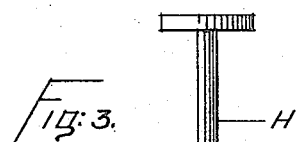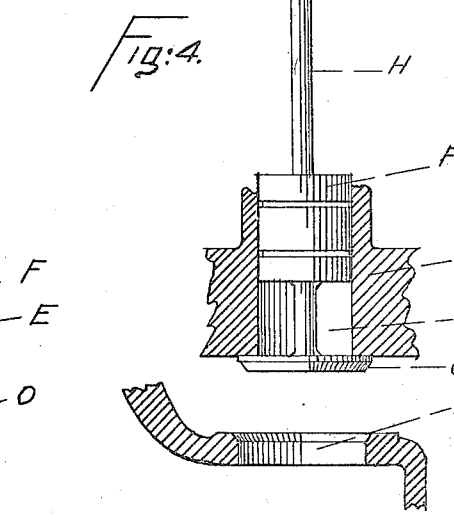

UNITED STATES PATENT OFFICE.

GEORGE C. HALL AND ALFRED BRADSHAW, OF CALGARY, ALBERTA, CANADA.

VALVE FOR PIPES FOR THE CONDUCTION OF LIQUID AND GASEOUS FLUIDS.

1,222,758. Specification of Letters Patent. Patented Apr. 17, 1917.

Application filed August 30, 1915. Serial No. 48,142.

*To all whom it may concern:*

Be it known that we, GEORGE CUNNINGHAM HALL, of the city of Calgary, in the Province of Alberta, Canada, and ALFRED BRADSHAW, of the same place, have jointly invented a new and useful Improvement in Valves for Pipes for the Conduction of Liquid and Gaseous Fluids, of which the following is a specification.

This invention relates to valves for pipes for the conduction of liquid and gaseous fluids (capable of being placed under pressure) and more particularly for pipes conducting gas, and the primary object of the invention is to provide a valve for such pipes which when opened will remain open so long as there is a certain minimum pressure in the pipes and valve and which when the pressure falls below the said fixed minimum (or is entirely removed) will close automatically and will remain closed when the pressure is returned, thus providing, for example, in the case of gas piped into buildings for lighting and heating purposes, a valve which when the gas is turned off, extinguishing the burner will prevent the gas coming through the pipes and out through the open burners into the building.

Another object of this invention is to provide a valve on such pipes which may be easily and quickly shut off from a distance providing a valve for example, which may be located within a building and shut off from outside the building in case of fire or other emergency.

Another object of this invention is to provide a valve on such pipes which will automatically close in case of fire reaching the said valve and which will close when the temperature of the atmosphere around the valve reaches a certain degree.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings in which similar letters refer to similar parts throughout the several views, and in which;

Fig. 2 is a view of the valve with apparatus for mechanical closing of the valve.

Figs. 3 and 4 are vertical cross sections of portions of the valve showing the moving parts as they would appear when the valve is closed and open respectively.

Figure 1:
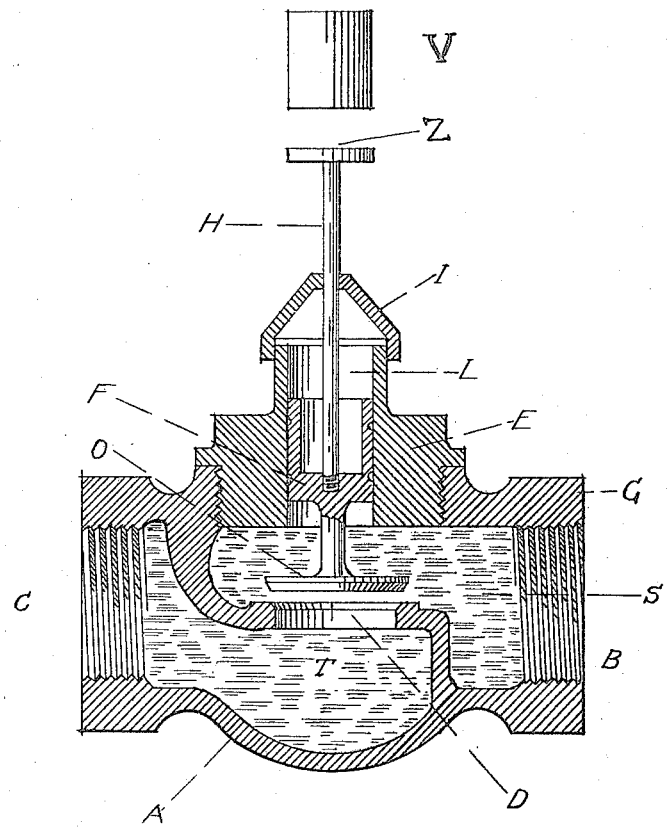
Figure 1 is a vertical cross section of a valve constructed in accordance with this invention.

Referring more particularly to the drawings, A designates a portion of an ordinary valve (commonly known as a globe valve) which joins two sections of cylindrical piping (not shown) connected to the valve at B and C respectively. The fluid enters the valve at B under pressure and when the valve is opened as in Fig. 4, passes through the circular opening D from the chamber S into the chamber T and out through the opening at C into the other conductor pipe. E is a metal casting fitted into the top of the globe valve A and forming a vertical cylinder L finely machined and of uniform size in which the piston F moves vertically. The piston F is finely machined so that it fits E snugly and has two annular grooves containing oil for purposes of lubrication and to form a seal. The piston F must fit the cylinder L so that with the oil seal it will prevent the escaping of the fluid from the valve. A portion of the piston is hollow so that its weight may be increased by the addition of lead or similar substance. Forming part of F is a substantially circular flat metal valve head O which when the valve is closed as in Fig. 3 fits snugly into the valve seat in the opening D completely closing the opening D and shutting the chamber S from the chamber T; the edges of O and D are chamfered so as to secure a greater surface of contact. The rod H is attached to the piston F for the purpose of operating the valve by hand and for the purpose of working the valve by the mechanical attachment hereinafter described. I is a cap covering E and preventing the introduction of dirt into the cylinder L. M is a metal bracket attached to the globe valve A at N with an arm R pivoted on M at K with a weight V at one end. To this arm is attached a chain at P which when drawn will cause the weight V to fall on H at Z pushing the piston F downward and closing the valve which will remain closed. X is a piece of fuse wire attached to R at P and to A at N of such a length that it holds V suspended over H allowing the piston F to be raised and the valve opened. When the atmospheric temperature at X reaches a sufficient height to melt X the weight V will drop on H at Z closing the valve.

The operation of the valve is as follows: When the valve is attached to the conductor pipes at B and C with the mechanism extending upwardly, and there is no pressure in the pipes and valve, the weight of the piston F will cause it to fall until the valve head O rests in the valve seat at D as in Fig. 3. When the fluid under pressure is introduced into the conductor pipe which is joined to the valve at B and the piston F and valve head O are raised by lifting H by hand or other external force, the fluid is allowed to flow through the opening D from the chamber S to the chamber T and out through the valve into the other conductor pipe at C. There being then a fluid pressure exerted upon the lower surface of the piston F it will be held up as in Fig. 4 and the minimum pressure required to hold it in such a position (thus keeping the valve opened) may be regulated by weighting the piston F (the heavier the piston F is weighted the more pressure will be required to hold it up). When the pressure for any reason is reduced below the minimum required to overcome the weight of the piston F the valve head O and connecting rod and the rod H, or when the pressure is entirely removed, they will fall so that the valve head O will rest in the valve seat at the opening D as in Fig. 3. When the pressure comes on again through the opening B into chamber S pressure will be exerted downward upon the top of O and the area of O being greater than the area of the lower end of the piston F, O will remain in the valve seat at the opening D and the valve will remain closed preventing the transmission of the fluid from chamber S into chamber T and out to the conductor pipe at C. To open the valve it will be, therefore, necessary to lift the rod H by hand or other external force.

From the foregoing description taken in connection with the accompanying drawings the advantage of construction and of the method of operation of the automatic valve for pipes conducting liquid and gaseous fluids will be readily apparent to those skilled in the art to which this invention appertains and while in the foregoing description the principle of the operation of this invention has been described together with various features of construction, the combination and arrangement of the parts may be altered to suit practical conditions provided such alterations are comprehended with the scope of what is claimed.

What we do claim as our invention and desire to secure by Letters Patent is:—

In valves for pipes conducting liquid or gaseous fluids the combination with a globe valve body of a vertical cylinder set in the top of the valve body, a piston and rod operating vertically in the said cylinder and having attached at the lower end of the rod a substantially flat valve cap for closing the opening between the inlet and outlet of the valve body,—a rod attached to the upper end of the piston and extending beyond the upper end of the cylinder; a vertical bracket attached to one side of the globe valve body and extending above the top of the said rod attached to the upper end of the piston; at the upper end of the said bracket an arm pivoted intermediate its length with a weight at one end immediately above the last named rod, a chain attached to the other end of the said arm, a piece of fuse wire attaching the last mentioned end of said arm to the globe valve body so that the said weight is suspended over the rod attached to the upper end of the piston.

In testimony whereof we affix our signatures in the presence of two witnesses.

GEORGE C. HALL.
ALFRED BRADSHAW.

Witnesses:
   THECLA G. LA MARCHE,
   C. MONTROSE WRIGHT.